(12) United States Patent
Netter et al.

(10) Patent No.: US 7,284,085 B2
(45) Date of Patent: Oct. 16, 2007

(54) MANAGING CONFIGURATION DATA IN A FLASH CONFIGURATION SPACE IN FLASH MEMORY WITHIN A HOST INTERFACE PORT

(75) Inventors: Christopher Joseph Netter, Costa Mesa, CA (US); Todd Blair Blachowiak, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 320 days.

(21) Appl. No.: 10/978,801

(22) Filed: Nov. 1, 2004

(65) Prior Publication Data

US 2006/0095649 A1    May 4, 2006

(51) Int. Cl.
*G06F 12/00* (2006.01)
(52) U.S. Cl. .................................... 711/103; 711/156
(58) Field of Classification Search ............ 711/103, 711/156, 170, 173
See application file for complete search history.

(56) References Cited

U.S. PATENT DOCUMENTS 5,479,638 A    12/1995    Assar et al.
2005/0216687 A1 *    9/2005    Fu ............................. 711/165

* cited by examiner

*Primary Examiner*—Jack A. Lane
(74) *Attorney, Agent, or Firm*—Morrison & Foerster LLP

(57) ABSTRACT

A flash configuration space is disclosed for storing configuration data regions. Each configuration data region includes configuration data and a signature tag that identifies the configuration data with various levels of specificity. During a configuration data update, a header in each configuration data region is scanned to see if a valid matching configuration data region already exists. If no valid matching configuration data region exists, the signature tag and configuration data are written into the next available area in the flash configuration space. If a valid matching configuration data region is located, the header and configuration data are written into the next available area in the flash configuration space and the located configuration data region is invalidated. When the flash configuration space is full, all valid configuration data regions are saved, the flash configuration space is erased, and only current configuration data is written back into the flash configuration space in a priority order.

41 Claims, 3 Drawing Sheets

MANAGING CONFIGURATION DATA IN A FLASH CONFIGURATION SPACE IN FLASH MEMORY WITHIN A HOST INTERFACE PORT

BACKGROUND OF THE INVENTION

1. Field of the Invention

The present invention relates, generally, to memory management, and in particular embodiments, to the use of abstracted signature tags for the efficient memory management of data elements stored in flash memories.

2. Description of Related Art

A generalized representation of an exemplary computing system is illustrated in FIG. 1. A computer or server identified generally herein as a host 100 is connected to a host bus 102 (e.g. a PCI-X bus). The host 100 typically includes one or more host processors 104, cache 106, and main memory 108. Also attached to the host bus 102 is at least one host (e.g. a host bus adapter (HBA), an I/O controller, or the like), configured by its firmware as an interface to the host 100 and identified generally herein as a host interface port 110. The host 100 and the host interface ports 110 may all reside within the same chassis or on the same circuit board.

The host interface port 110 may include a controller chip 112 incorporating many of the functions performed by the host interface port 110, and flash memory 114. The controller chip 112 may be employed in a HBA for transferring data between devices connected to the host bus 102 and one or more storage devices in one or more storage area networks (SANs) 116 (i.e. a link). In the example system illustrated in FIG. 1, the controller chip 112 may support multiple channels or ports and FC (Fibre Channel), SAS (Serial Attached SCSI) and SATA (Serial ATA) protocols. Each channel on the controller chip 112 comprises a serializer/deserializer (SerDes) 118 and a FC/SAS/SATA protocol core engine (FSENG) 120 coupled to the SerDes 118. A bus interface unit 122 couples one or many FSENGs 120 to SRAM 124 and to multiple processors 126 via a processor bus 128. Also connected to the processor bus 128 is a universal asynchronous receiver/transmitter (UART) 130, an address translation unit 132, and an interprocessor messaging unit (IMU) 134.

The external flash memory 114 is inexpensive, nonvolatile, and high capacity, but also slow. The flash memory 114 is available throughout the operation of the computing system. When the host interface port 110 is initialized, boot code in the flash memory 114 is first executed, other areas of the flash memory 114 are read to determine how to configure the Bus Interface Unit 122, so that the Host 100 can complete the configuration of the Host bus 102, and the firmware initially stored in external flash memory 114 is copied into the SRAM 124. The processors 126 then execute the firmware stored in the SRAM 124, and also utilize their own cache for storing code and data.

FIG. 2 illustrates an exemplary flash configuration space 200 (e.g. a 128 kByte area) in flash memory for storing parameters, settings, and other configuration data to configure the processors, the FSENGs, the SerDes, the host bus, and the like. Flash memory is utilized to store configuration data because it is nonvolatile. The configuration space 200 is partitioned into N configuration data regions 202 (e.g. 32 regions) of a fixed size (e.g. 4 kBytes) for storing the configuration data. In conventional host interface ports that support one or a few channels and a single protocol, only a few of the N configuration data regions 202 are needed to store the configuration data for the system. Each of the configuration data regions 210 stores configuration data 214 for a particular entity (e.g. a SerDes, a FSENG, a processor, a host bus, or the like), written into the flash memory by the firmware. Each configuration data region 210 also includes a header 204, which contains a region identifier 206 and a data depth indicator 208, which may comprise a bitmap or other data structure that indicates how far into the configuration data region 210 the configuration data 214 has been written. For example, a data depth indicator bitmap 208 may contain bits that are set to zero every time another fixed sized block of updated configuration data 214 is written into the configuration data region 210.

Although configuration data 214 is written into the configuration data regions 202 by the firmware, the writing of configuration data 214 can be initiated by either the firmware or the host. When the writing of configuration data 214 is initiated by the host, a software driver in the host (see FIG. 1) sends a request (containing the region identifier 206 and the configuration data 214) to the firmware to write the configuration data 214 into one of the N configuration data regions 202.

The flash memory is erasable in discrete sectors or flash erase units. In other words, the flash memory must be erased in blocks. The configuration space 200 is equivalent to one or more complete flash erase units, and therefore must be erased all at once. Each configuration data region 210 is large enough to store one or more outdated versions of configuration data 216 and a current version of the configuration data 214. When updating the configuration data region 210 with current configuration data 214, it is generally preferable to keep the outdated configuration data 216 rather than erase it, because the alternative is to erase not only the outdated configuration data 216 for that configuration region 210, but all N configuration data regions 202 in the flash configuration space 200, due to the limitation that the flash must be erased in blocks that contain multiple configuration regions 210.

When an update to the configuration data is needed, the firmware executes an update configuration command. To perform the update configuration command, the firmware first locates the proper configuration data region 210. Next, the data depth 208 is used in conjunction with the known fixed size of each block of configuration data for that particular configuration data region 210 to determined the next available location in the configuration data region 210. The updated configuration data 214 is written into the next available location, and the data depth 208 is updated.

A similar procedure is used when the firmware wants to simply read configuration data from the flash configuration space 200. To read particular configuration data, the proper configuration data region 210 is located, the data depth is used 208 in conjunction with the known fixed size of each block of configuration data for that particular configuration data region 210 to determined the location of the current configuration data 214 in the configuration data region 210, and the current configuration data 214 is read from the configuration data region 210 and stored into SRAM in the host interface port for subsequent use in configuring entities within the computing system.

Referring again to the updating of configuration data, eventually, after multiple updates to the same configuration data region 210, the data depth 208 will indicate that the configuration data region 210 is full or nearly full. When this occurs, and another update to the configuration data for that configuration data region 210 is required, a housekeeping procedure must first be performed.

The housekeeping procedure is initiated when an update to a configuration region 210 is requested and no space is available in that region. To perform the housekeeping procedure, all of the data in the flash configuration space 200 is initially saved off to another region of memory. The flash configuration space 200 is then erased, and then only the current, updated configuration data for the various configuration data regions 202 is written back into the flash configuration space 200. By so doing, the obsolete configuration data is eliminated from the configuration data regions 202, and further updates are again possible. However, the erasing of the flash configuration space 200 is time-consuming and can be inefficient, especially if one set of configuration data stored in one particular configuration data region 210 is constantly updated. In that case, although one configuration data region 210 may be getting filled up, many of the other configuration data regions 202 are empty or nearly empty, and yet all configuration data regions 202 within a flash erase unit must be saved off, erased, and re-written.

As described above, in conventional host interface ports that support one or a few channels and a single protocol, the N configuration data regions 202 are generally sufficient to store the configuration data for the system. However, for host interface ports that have multiple channels (and therefore multiple FSENGs and multiple SerDes) and that handle multiple protocols (e.g. FC, SAS, and SATA), many more configuration data regions 210 may be needed to store all of the configuration data. To accommodate the increased number of configuration data regions within the same flash configuration space 200, each configuration data region 210 would become so small (e.g. 32 Bytes) that the regions would quickly fill up, requiring many housekeeping procedures and time-consuming erasures of the flash configuration space 200.

Therefore, a need exists to rearrange the flash configuration space in an efficient manner that minimizes the frequency of erasing the flash configuration space and enables the storing of configuration data for multi-channel, multi-protocol host interface ports.

SUMMARY OF THE INVENTION

The present invention is directed to a flash configuration space in flash memory for storing configuration data to configure a computing system. Configuration data is written into the flash configuration space in the order in which configuration data update requests are received or initiated in firmware in the host interface port. Each configuration data region stores parameters, settings, and other configuration data for a particular entity (e.g. a SerDes, a FSENG, a host bus, or the like). Each configuration data region includes a header, which contains a valid bit, a signature tag, a data depth indicator (which indicates the size of the configuration data in the region), and the configuration data itself.

The signature tag is capable of identifying configuration data with various levels of specificity. For example, each of N regions may be associated with M processors or cores, each processor may be associated with P interface software ports, each interface software port may be associated with Q protocol ports, and each protocol port may be associated with R physical ports, for a theoretical total of N×M×P×Q×R configuration data regions.

However, in practical applications, many of these possible configuration data regions will never have configuration data stored into the flash configuration space. To facilitate specifying configuration data with a broader scope (i.e. specified at higher hierarchical levels), the signature tags may also include a "processing type" parameter, which identifies the scope of the associated configuration data. For example, if the processing type is set to core level configuration data, then the relevant portion of the signature tag only consists of the region identifier and the processor core identifier, and the other identifiers can be treated as "don't cares" or ignored.

When an update to the configuration data is needed, the firmware executes an update configuration command. To perform the update configuration command, the firmware first compiles the signature tag. Starting with the first configuration data region in the flash configuration space, the firmware scans the header of each configuration data region to see if a valid configuration data region (as determined by the valid bit being set to one) already exists with that same signature tag.

As long as no valid configuration data region is found with same signature tag and there are more configuration data regions to check, the start of the next configuration data region is determined, and the header of the next configuration data region is read. If all the configuration data regions are checked and no valid configuration data region exists with that same signature tag, then the signature tag and data depth are written as a header into the next available area in the flash configuration space along with the actual configuration data. The valid bit, which is already set to one (because erasing the flash results in all bits being set to one), is maintained as a one in the header.

If, during the scan, a valid configuration data region is located with the same signature tag, the firmware knows that the current configuration data is an update to the previous configuration data. The firmware then stops the scan and writes the header and configuration data into the next available area in the flash configuration space, keeping the valid bit set to one. Once the new configuration data is written, the firmware sets the valid bit of the located configuration data region having the same signature tag to zero, indicating that this configuration data region is no longer valid.

A similar procedure is used when the firmware wants to simply read configuration data from the flash configuration space. The firmware first compiles a complete signature tag, then searches through the flash configuration space until a configuration data region is found with a matching signature tag and a valid bit set to one. Once this configuration data region is found, the search is stopped and the configuration data is read from the configuration data region and stored into SRAM in the host interface port for subsequent use in configuring entities within the computing system.

An erase of the flash configuration space is only required when the entire flash configuration space becomes full or nearly full. When the firmware determines that the flash configuration space is full or nearly full, and another configuration data region needs to be written to the flash configuration space, all of the valid configuration data regions (identified by a valid bit set to one) in the flash configuration space must be saved off to another region of memory. The flash configuration space is then erased, and then only the configuration data for the current, updated configuration data regions (identified by a valid bit set to one) is written back into the flash configuration space. By so doing, the obsolete configuration data (identified by a valid bit set to zero) is eliminated from the configuration data regions, and further updates are again possible.

DETAILED DESCRIPTION OF PREFERRED EMBODIMENTS

In the following description of preferred embodiments, reference is made to the accompanying drawings that form a part hereof, and in which is shown by way of illustration specific embodiments in which the invention may be practiced. It is to be understood that other embodiments may be utilized and structural changes may be made without departing from the scope of the preferred embodiments of the present invention.

Figure 3:
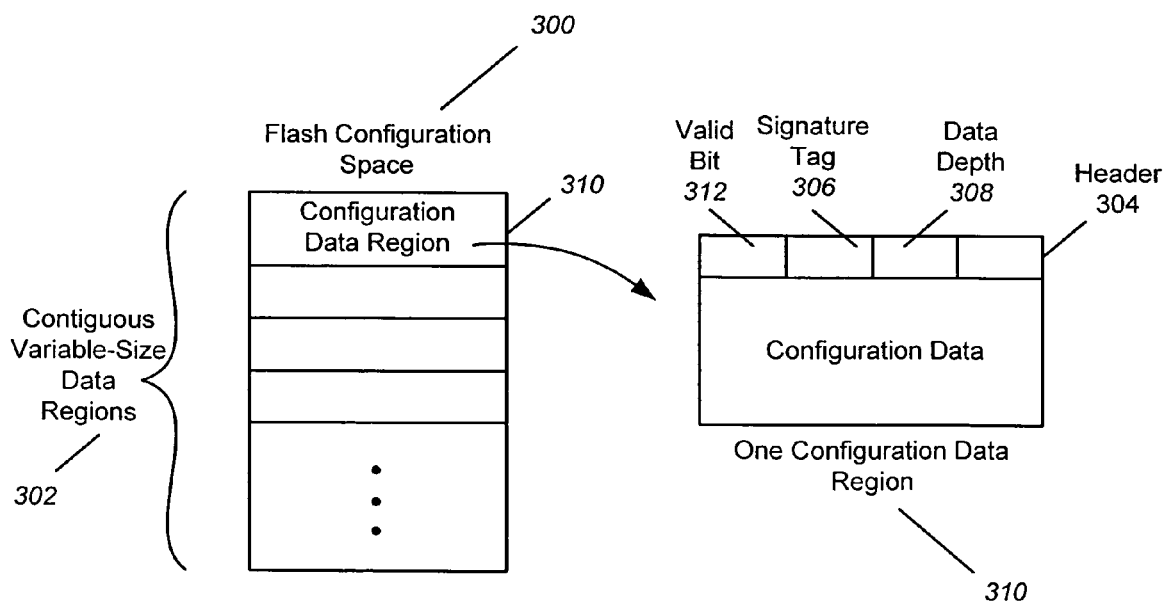
FIG. 3 illustrates an exemplary flash configuration space in flash memory for storing configuration data according to embodiments of the present invention.

FIG. 3 illustrates an exemplary specific, preferred embodiment of a flash configuration space 300 (e.g. a 128 kByte area) in flash memory for storing configuration data to configure a computing system. The configuration space 300 is not partitioned into a fixed number of fixed size configuration data regions for storing the configuration data. Instead, configuration data is written into the flash configuration space 300 in contiguous regions 302 in the order in which writes into the flash memory are received from the host software driver or firmware in the host interface port. Although each configuration data region 310 is fixed in size for a particular region identifier, because configuration data with different region identifiers will be consecutively written into the flash configuration space 300, the configuration data regions 302 in the flash configuration space 300 may be a different size. Each configuration data region 310 stores parameters, settings, and other configuration data for a particular entity (e.g. a SerDes, a FSENG, a host bus, or the like). Each configuration data region 310 includes a header 304, which contains a valid bit 312, a signature tag 306, a data depth indicator 308 (which indicates the size of the configuration data region 310), and the configuration data itself 314.

Figure 1:
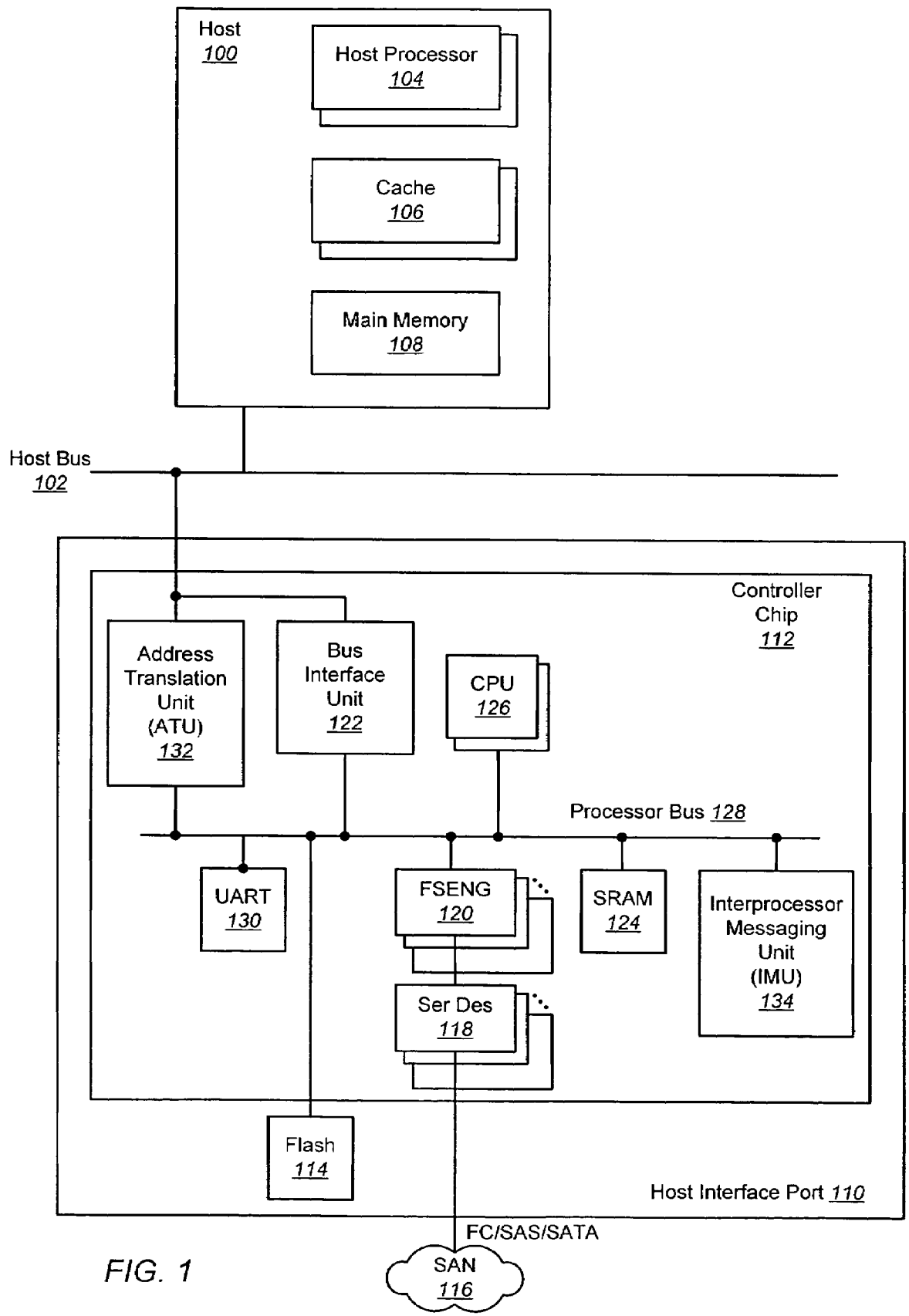
FIG. 1 illustrates an exemplary computing system.
Figure 2:
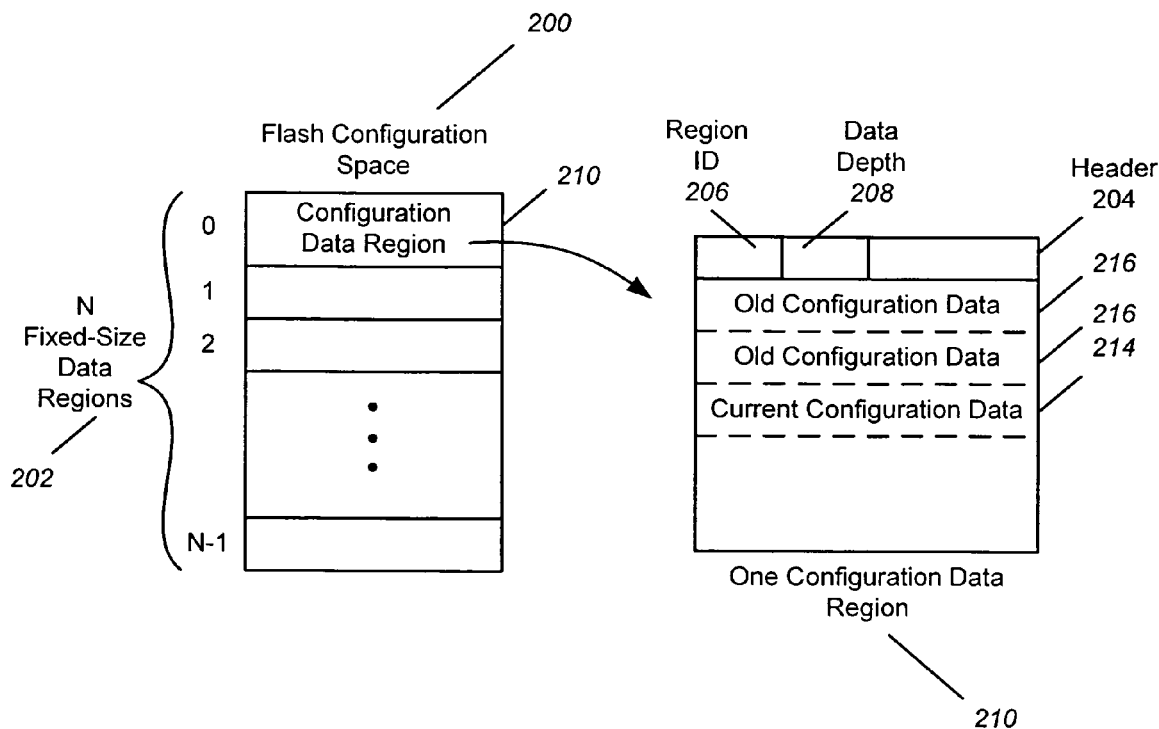
FIG. 2 illustrates an exemplary conventional flash configuration space in flash memory for storing configuration data.
Figure 4:
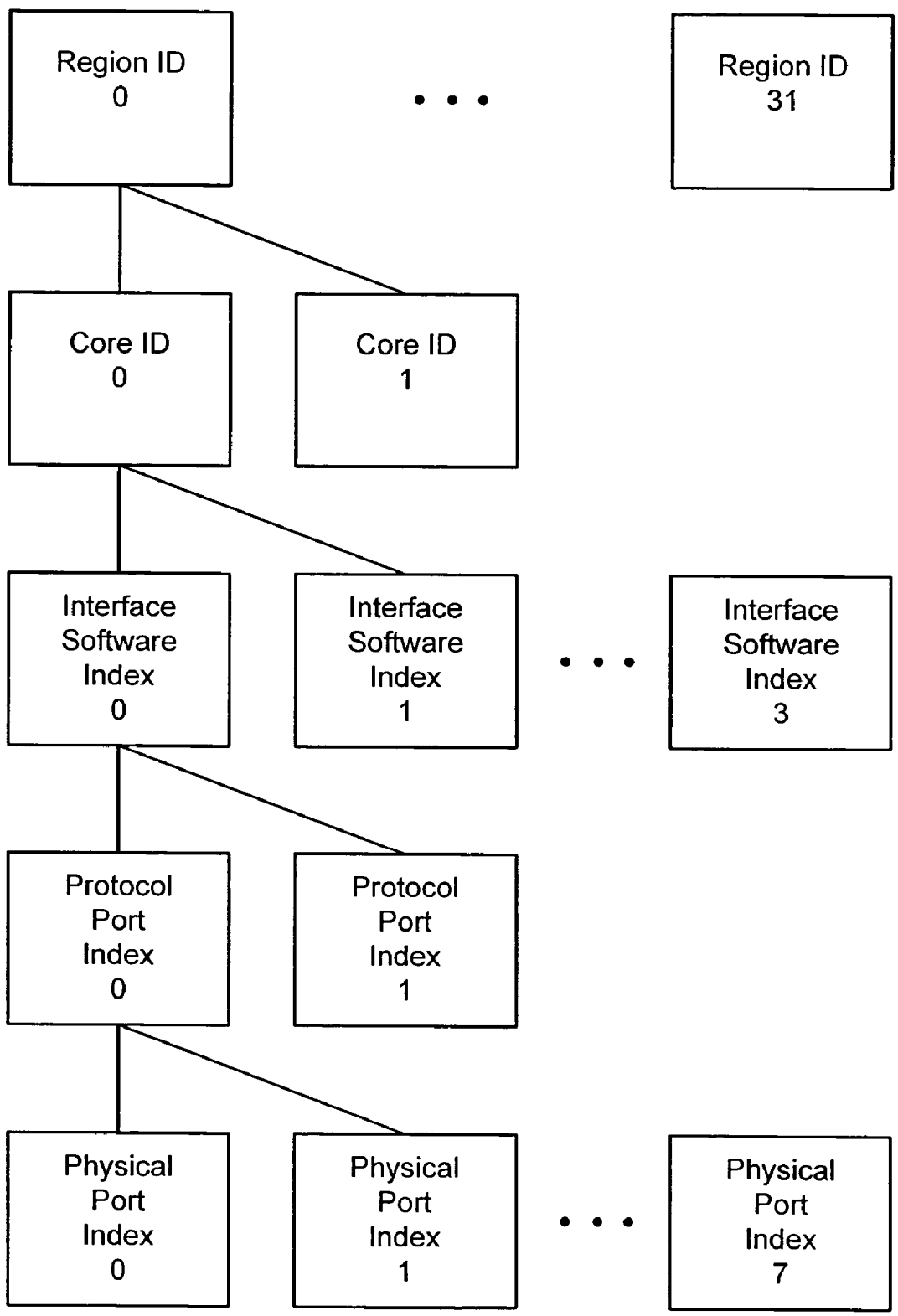
FIG. 4 is an exemplary hierarchical tree diagram illustrating the various levels of specificity to which configuration data may be identified according to embodiments of the present invention.

Instead of identifying one of only N regions, the signature tag is capable of identifying configuration data with greater specificity. FIG. 4 is an exemplary hierarchical tree diagram illustrating the various levels of specificity to which configuration data may be identified according to embodiments of the present invention. As FIG. 4 illustrates, each of the N regions 400 (e.g. regions 0-31 in FIG. 2) may be associated with M processors or cores 402 (e.g. two processors 126 in FIG. 1), each processor 402 may be associated with P interface software ports 404 (e.g. four interface software ports, each one associated with a particular driver in the host), each interface software port 404 may be associated with Q protocol ports 406 (e.g. two protocol ports, one for FC and one for SAS/SATA), and each protocol port 406 may be associated with R physical ports 408 (e.g. eight FSENGs 120 in FIG. 1), for a theoretical total of N×M×P×Q×R configuration data regions 302. Note that the N regions were maintained to ensure compatibility with conventional systems, and that in embodiments of the present invention any number of levels and counts of hierarchical entities may be employed. Thus, in an example multi-channel, multi-protocol host interface port with 32 regions, 2 processors per region, 4 interface software ports per processor, 2 protocol ports per interface software port, and 8 physical ports per protocol port, the signature tag 306 would be capable of identifying 32×2×4×2×8=4096 configuration data regions.

However, in practical applications, many of these possible configuration data regions 302 will never have configuration data stored into the flash configuration space 300, and thus the same size flash configuration space 300 can be used even for multi-channel, multi-protocol host interface ports. For example, when the firmware initiates updates to the configuration data, it may only specify a region and processor core. To facilitate specifying configuration data with a broader scope (i.e. specified at higher hierarchical levels), the signature tags may also include a "processing type" parameter, which identifies the scope of the associated configuration data. For example, if the processing type is set to core level configuration data, then the relevant portion of the signature tag only consists of the region identifier and the processor core identifier, and the other identifiers can be treated as "don't cares" or ignored.

When an update to the configuration data is needed, the firmware executes an update configuration command. To perform the update configuration command, the firmware first compiles the signature tag 306 using the region ID, core ID, interface software index, protocol port index, and physical port index. Starting with the first configuration data region in the flash configuration space 300, the firmware scans the header 304 of each configuration data region to see if a valid configuration data region (as determined by the valid bit being set to one) already exists with that same signature tag 306. Even if the valid bit indicates that the configuration data region 310 is invalid (valid bit set to zero), the header 304 for each configuration data region 310 must be read, because the firmware must also read the data depth 308 to determine the start of the next configuration data region 310.

As long as no valid configuration data region 310 is found with same signature tag 306 and there are more configuration data regions 302 to check, the start of the next configuration data region 310 is determined, and the header of the next configuration data region is read. If all the configuration data regions are checked and no valid configuration data region exists with that same signature tag 306, then the signature tag 306 and data depth 308 are written as a header 304 into the next available area in the flash configuration space 300 along with the actual configuration data 314. The valid bit 312, which is already set to one (because erasing the flash results in all bits being set to one), is maintained as a one in the header 304.

If, during the scan, a valid configuration data region is located with the same signature tag 306, the firmware knows that the current configuration data 314 is an update to the previous configuration data. The firmware then stops the scan and writes the header 304 and configuration data 314 into the next available area in the flash configuration space 300, keeping the valid bit 312 set to one. Once the new configuration data is written, the firmware sets the valid bit 312 of the located configuration data region 310 having the same signature tag 306 to zero, indicating that this configuration data region 310 is no longer valid.

A similar procedure is used when the firmware wants to simply read configuration data from the flash configuration space 300. The firmware first compiles a complete signature tag 306, then searches through the flash configuration space 300 until a configuration data region 310 is found with a matching signature tag 306 and a valid bit 312 set to one. Once this configuration data region is found, the search is stopped and the configuration data 314 is read from the configuration data region 310 and stored into SRAM in the host interface port for subsequent use in configuring entities within the computing system.

Note that embodiments of the present invention utilize the same size flash configuration space as conventional methods. However, instead of forcing an erase of the flash configuration space 300 each time a fixed size configuration data region becomes full, embodiments of the present invention only require an erase of the flash configuration space 300 when the entire flash configuration space 300 becomes full or nearly full. This result is possible because embodiments of the present invention store variable size configuration data regions 310 in contiguous areas of the flash configuration space 300 in accordance with the order in which the configuration data 314 was received. Thus, when the firmware determines that the flash configuration space 300 is full or nearly full, and another configuration data region 310 needs to be written to the flash configuration space 300, all of the valid configuration data regions 302 (identified by a valid bit set to one) in the flash configuration space 300 must be saved off to another region of memory. The flash configuration space 300 is then erased, and then only the configuration data for the current, updated configuration data regions 302 (identified by a valid bit set to one) is written back into the flash configuration space 300. By so doing, the obsolete configuration data (identified by a valid bit set to zero) is eliminated from the configuration data regions 302, and further updates are again possible.

In addition, the configuration data regions 302 may be rewritten into the flash configuration space 300 in an efficient order. Because the firmware may need to access certain configuration data frequently (e.g. configuration data needed for the initialization of the firmware), the firmware can prioritize the configuration data in a list, and high priority configuration data can be rewritten into the flash configuration space 300 in accordance with this list. By writing the configuration data into the flash configuration space in priority order, the firmware will not have to step through as many configuration data regions 302 before finding the configuration data it needs.

Because embodiments of the present invention only require an erase of the flash configuration space 300 when the entire flash configuration space 300 becomes full, fewer erasures of the flash configuration space 300 are needed, and the throughput or performance of the host interface port can be improved because the buses within the host interface port are less busy performing housekeeping tasks on the flash memory.

Note that the host driver software need not be modified to support embodiments of the present invention. The additional header information in embodiments of the present invention, such as the valid bit and signature tag, occupy previously reserved fields in the firmware's update configuration command. Thus, if the host driver software sends a request to the firmware in the host interface port to update the configuration of the host bus, for example, it need only provide a conventional update configuration command containing a region ID, and the configuration data itself. The firmware will then compile the complete signature tag using the information from the conventional update configuration command and its own knowledge of the interface software port through which the request was received from the host. Because each interface software port is associated with only one processor core, once the interface software port is determined, the processor core is also known.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A method for managing configuration data in a flash configuration space in flash memory within a host interface port, comprising:
   selecting the flash configuration space to be an integer number of flash erase units;
   writing the configuration data and a signature tag for identifying the configuration data in contiguous configuration data regions in the flash configuration space according to an order in which the configuration data is received such that most or all of the flash configuration space can be written before it becomes necessary to eliminate outdated configuration data.

2. The method as recited in claim 1, further comprising:
   writing an associated data depth indicator and a valid bit indicating whether the configuration data is valid along with the configuration data and the signature tag in the contiguous configuration data regions.

3. The method as recited in claim 2, further comprising:
   scanning the signature tag and the valid bit of each of the contiguous configuration data regions written in the flash configuration space in an attempt to locate a valid, previously stored configuration data region with a signature tag that matches the signature tag of updated configuration data to be stored in the configuration data region;
   writing the updated configuration data and an associated signature tag, data depth indicator and a valid bit set to a valid state into the next available configuration data region in the flash configuration space; and
   if any valid, previously stored configuration data region is located with a signature tag that matches the signature tag of the updated configuration data and with the valid bit set to the valid state, setting the valid bit of that configuration data region to an invalid state to indicate that the previously stored configuration data region is now outdated.

4. The method as recited in claim 2, further comprising:
   determining when the flash configuration space is full or nearly full;
   scanning the valid bit of each of the contiguous configuration data regions written in the flash configuration space and locating all valid configuration data regions;
   saving the valid configuration data regions to an area of memory outside the flash configuration space;
   erasing the flash configuration space; and
   writing the valid configuration data regions back into the flash configuration space.

5. The method as recited in claim 4, further comprising writing the valid configuration data regions back into the flash configuration space in a specified order.

6. The method as recited in claim 5, wherein the specified order is a priority order with the highest priority given to the configuration data region that is accessed most frequently.

7. The method as recited in claim 1, wherein the signature tag is capable of identifying the configuration data with various levels of specificity according to a hierarchy of entities.

8. The method as recited in claim 7, wherein the hierarchy of entities is, from highest to lowest, a region identifier, a processor core identifier, an interface software port index, a protocol port index, and a physical port index.

9. The method as recited in claim 7, wherein the signature tag specifies an entity at a particular hierarchical level in the hierarchy of entities and a processing type parameter that indicates the particular hierarchical level.

10. The method as recited in claim 9, further comprising:
receiving an update configuration data command including the region identifier, the protocol port index, the physical port index, the processing type parameter and the configuration data; and
appending the interface software port index and the processor core identifier to form the signature tag.

11. One or more storage media including a computer program which, when executed by one or more processors, causes the one or more processors to perform the steps of:
selecting flash configuration space to be an integer number of flash erase units;
writing configuration data and a signature tag for identifying the configuration data in contiguous configuration data regions in the flash configuration space according to an order in which the configuration data is received such that most or all of the flash configuration space can be written before it becomes necessary to eliminate outdated configuration data.

12. The one or more storage media as recited in claim 11, wherein the computer program, when executed by one or more processors, causes the one or more processors to perform the step of:
writing an associated data depth indicator and a valid bit indicating whether the configuration data is valid along with the configuration data and the signature tag in the contiguous configuration data regions.

13. The one or more storage media as recited in claim 12, wherein the computer program, when executed by one or more processors, causes the one or more processors to perform the steps of:
scanning the signature tag and the valid bit of each of the contiguous configuration data regions written in the flash configuration space in an attempt to locate a valid, previously stored configuration data region with a signature tag that matches the signature tag of updated configuration data to be stored in the configuration data region;
writing the updated configuration data and an associated signature tag, data depth indicator and a valid bit set to a valid state into the next available configuration data region in the flash configuration space; and
if any valid, previously stored configuration data region is located with a signature tag that matches the signature tag of the updated configuration data, setting the valid bit of that configuration data region to an invalid state to indicate that the previously stored configuration data region is now outdated.

14. The one or more storage media as recited in claim 12, wherein the computer program, when executed by one or more processors, causes the one or more processors to perform the steps of:
determining when the flash configuration space is full or nearly full;
scanning the valid bit of each of the contiguous configuration data regions written in the flash configuration space and locating all valid configuration data regions;
saving the valid configuration data regions to an area of memory outside the flash configuration space;
erasing the flash configuration space; and
writing the valid configuration data regions back into the flash configuration space.

15. The one or more storage media as recited in claim 14, wherein the computer program, when executed by one or more processors, causes the one or more processors to perform the step of:
writing the valid configuration data regions back into the flash configuration space in a specified order.

16. The one or more storage media as recited in claim 15, wherein the specified order is a priority order with the highest priority given to the configuration data region that is accessed most frequently.

17. The one or more storage media as recited in claim 11, wherein the signature tag is capable of identifying the configuration data with various levels of specificity according to a hierarchy of entities.

18. The one or more storage media as recited in claim 17, wherein the hierarchy of entities is, from highest to lowest, a region identifier, a processor core identifier, an interface software port index, a protocol port index, and a physical port index.

19. The one or more storage media as recited in claim 17, wherein the signature tag specifies an entity at a particular hierarchical level in the hierarchy of entities and a processing type parameter that indicates the particular hierarchical level.

20. The one or more storage media as recited in claim 19, wherein the computer program, when executed by one or more processors, causes the one or more processors to perform the steps of:
receiving an update configuration data command including the region identifier, the protocol port index, the physical port index, the processing type parameter and the configuration data; and
appending the interface software port index and the processor core identifier to form the signature tag.

21. In a host interface port for managing configuration data in a flash configuration space in flash memory within the host interface port, one or more processors programmed for:
selecting flash configuration space to be an integer number of flash erase units; and
writing the configuration data and a signature tag for identifying the configuration data in contiguous configuration data regions in the flash configuration space according to an order in which the configuration data is received such that most or all of the flash configuration space can be written before it becomes necessary to eliminate outdated configuration data.

22. The one or more programmed processors as recited in claim 21, further programmed for:
writing an associated data depth indicator and a valid bit indicating whether the configuration data is valid along with the configuration data and the signature tag in the contiguous configuration data regions.

23. The one or more, programmed processors as recited in claim 22, further programmed for:
scanning the signature tag and the valid bit of each of the contiguous configuration data regions written in the flash configuration space in an attempt to locate a valid, previously stored configuration data region with a signature tag that matches the signature tag of updated configuration data to be stored in the configuration data region;
writing the updated configuration data and an associated signature tag, data depth indicator and a valid bit set to a valid state into the next available configuration data region in the flash configuration space; and if any valid, previously stored configuration data region is located with a signature tag that matches the signature tag of the updated configuration data, setting the valid bit of that configuration data region to an invalid state to indicate that the previously stored configuration data region is now outdated.

24. The one or more programmed processors as recited in claim 22, further programmed for:

determining when the flash configuration space is full or nearly full;

scanning the valid bit of each of the contiguous configuration data regions written in the flash configuration space and locating all valid configuration data regions;

saving the valid configuration data regions to an area of memory outside the flash configuration space;

erasing the flash configuration space; and writing the valid configuration data regions back into the flash configuration space.

25. The one or more programmed processors as recited in claim 24, further programmed for:

writing the valid configuration data regions back into the flash configuration space in a specified order.

26. The one or more programmed processors as recited in claim 25, wherein the specified order is a priority order with the highest priority given to the configuration data region that is accessed most frequently.

27. The one or more programmed processors as recited in claim 21, wherein the signature tag is capable of identifying the configuration data with various levels of specificity according to a hierarchy of entities.

28. The one or more programmed processors as recited in claim 27, wherein the hierarchy of entities is, from highest to lowest, a region identifier, a processor core identifier, an interface software port index, a protocol port index, and a physical port index.

29. The one or more programmed processors as recited in claim 27, wherein the signature tag specifies an entity at a particular hierarchical level in the hierarchy of entities and a processing type parameter that indicates the particular hierarchical level.

30. The one or more programmed processors as recited in claim 29, further programmed for:

receiving an update configuration data command including the region identifier, the protocol port index, the physical port index, the processing type parameter and the configuration data; and appending the interface software port index and the processor core identifier to form the signature tag.

31. A host bus adapter (HBA) comprising the one or more programmed processors of claim 21.

32. A server computer comprising the HBA of claim 31.

33. A storage area network (SAN) comprising the server computer of claim 32.

34. A host interface port for managing configuration data in a flash configuration space in flash memory within the host interface port, comprising:

means for selecting flash configuration space to be an integer number of flash erase units; and means for writing the configuration data and a signature tag for identifying the configuration data in contiguous configuration data regions in the flash configuration space according to an order in which the configuration data is received such that most or all of the flash configuration space can be written before it becomes necessary to eliminate outdated configuration data.

35. The host interface port as recited in claim 34, further comprising:

means for writing an associated data depth indicator and a valid bit indicating whether the configuration data is valid along with the configuration data and the signature tag in the contiguous configuration data regions.

36. The host interface port as recited in claim 35, further comprising:

means for scanning the signature tag and the valid bit of each of the contiguous configuration data regions written in the flash configuration space in an attempt to locate a valid, previously stored configuration data region with a signature tag that matches the signature tag of updated configuration data to be stored in the configuration data region;

means for writing the updated configuration data and an associated signature tag, data depth indicator and a valid bit set to a valid state into the next available configuration data region in the flash configuration space; and if any valid, previously stored configuration data region is located with a signature tag that matches the signature tag of the updated configuration data, means for setting the valid bit of that configuration data region to an invalid state to indicate that the previously stored configuration data region is now outdated.

37. The host interface port as recited in claim 35, further comprising:

means for determining when the flash configuration space is full or nearly full;

means for scanning the valid bit of each of the contiguous configuration data regions written in the flash configuration space and locating all valid configuration data regions;

means for saving the valid configuration data regions to an area of memory outside the flash configuration space;

means for erasing the flash configuration space; and means for writing the valid configuration data regions back into the flash configuration space.

38. The host interface port as recited in claim 34, wherein the signature tag is capable of identifying the configuration data with various levels of specificity according to a hierarchy of entities.

39. A host bus adapter (HBA) comprising the host interface port of claim 34.

40. A server computer comprising the HBA of claim 39.

41. A storage area network (SAN) comprising the server computer of claim 40.

* * * * *